United States Patent [19]

Elghani et al.

[11] 4,097,429
[45] Jun. 27, 1978

[54] THERMOPLASTICALLY PROCESSIBLE MOULDING COMPOUND OF CELLULOSE ESTERS AND ETHYLENE/VINYL ESTERS COPOLYMERS

[75] Inventors: Salah Elabd Elghani, Zarga, Jordan; Winfried Fischer, Cologne; Richard Prinz, Leverkusen, both of Germany

[73] Assignee: Bayer Aktiengesellschaft, Leverkusen, Germany

[21] Appl. No.: 689,685

[22] Filed: May 24, 1976

Related U.S. Application Data

[63] Continuation-in-part of Ser. No. 581,706, May 28, 1975, abandoned.

[30] Foreign Application Priority Data

May 29, 1974 Germany .............................. 2426178

[51] Int. Cl.² .................................................. C08L 1/14
[52] U.S. Cl. .................................................. 260/17 R
[58] Field of Search ........................................ 260/17

[56] References Cited

U.S. PATENT DOCUMENTS

| | | | |
|---|---|---|---|
| T856,017 | 11/1968 | Jones ...................................... | 260/17 |
| 2,186,454 | 1/1940 | Gloor ...................................... | 260/17 R |
| 3,321,420 | 5/1967 | Unger ..................................... | 260/17 R |
| 3,454,349 | 7/1969 | Smart ..................................... | 260/17 R |
| 3,562,229 | 2/1971 | Bauer et al. ............................ | 260/17 R |
| 3,682,850 | 8/1972 | Coates .................................... | 260/17 R |
| 3,692,723 | 9/1972 | Kasagi et al. .......................... | 260/17 R |

OTHER PUBLICATIONS

Chem. Abst., vol. 76:128174w, "Plasticizer-containing Thermoplastic Molding and Coating Compositions", Ikeda et al.
Chem. Abst., vol. 66:76536m, "Thermoplastics with Better Flow Properties", Farbwerke Hoechst A.G.

*Primary Examiner*—Edward M. Woodberry
*Attorney, Agent, or Firm*—Connolly and Hutz

[57] ABSTRACT

Thermoplastically processible moulding compounds consisting essentially of
(1) at least one cellulose ester of an aliphatic carboxylic acid
(2) an incompatible ethylene/vinyl ester copolymer containing 30 to 75% by weight of vinyl esters and
(3) optionally, a compatible ethylene/vinyl ester copolymer containing 75.1 to 98% by weight of vinyl ester.

12 Claims, No Drawings

THERMOPLASTICALLY PROCESSIBLE MOULDING COMPOUND OF CELLULOSE ESTERS AND ETHYLENE/VINYL ESTERS COPOLYMERS

This application is a continuation-in-part of application Ser. No. 581,706, filed May 28, 1975, now abandoned.

This invention relates to transparent thermoplastically processible moulding compounds which comprise organic cellulose esters and ethylene/vinyl ester copolymers.

It is well known that cellulose can be thermoplastically processed only after it has been esterified with certain organic acids, and even then, in many cases only after incorporation of low molecular weight plasticizers into the esterified product. The three hydroxyl groups of the anhydroglucose units of cellulose are capable of being esterified with numerous organic acids but in practice only cellulose acetates, cellulose acetopropionates and cellulose acetobutyrates are used to any significant extent for this purpose. These esters are used to produce moulding compounds which can be thermoplastically processed as well as products such as acetate silk, block acetate, foil substrates for safety films, electric insulating foils and lacquers.

Moulding compounds of cellulose acetate cannot be thermoplastically processed without the addition of low molecular weight plasticizers because cellulose acetate begins to decompose before it softens. Cellulose acetopropionates and cellulose acetobutyrates also have their softening point and decomposition point fairly close together so that moulding compounds prepared from these esters must in general, also be mixed with low molecular weight plasticizers before they are thermoplastically processed. The addition of such plasticizers reduces the operating temperature and viscosity as required.

The plasticizers used for organic cellulose esters are mainly the aliphatic esters of phthalic acid, adipic acid, azelaic acid, sabacic acid and phosphoric acid, for example dimethylphthalate, diethylphthalate, dibutyl adipate, dioctyladipate, dibutylazelate, trichloroethyl phosphate and tributylphosphate. It is also advantageous to use mixtures of plasticizers.

Although cellulose ester moulding compounds which have been modified with plasticizers are sufficiently transparent, it would for many purposes be desirable to improve their dimensional stability under heat. Furthermore, the plasticizers migrate to the surface of the moulded articles over a period of time so that, for example, foils made of modified cellulose esters cannot be used for packaging certain foodstuffs.

Mixtures of organic cellulose esters, low molecular weight plasticizers and olefine polymers have been described in German Auslegeschrift No. 1,303,219 = British patent specification No. 1,004,204. However, such moulding compounds are no longer transparent if they have a high olefine polymer content. Moreover, the plasticizers used in these mixtures are the conventional low molecular weight esters, which have the well known disadvantages.

Mixtures of organic cellulose esters and copolymers of ethylene and unsaturated esters of fatty acids are known from U.S. Pat. No. 3,682,850. The solutions of these mixtures in organic solvents are used as film-forming lacquers. To obtain clear, compatible films the copolymer must contain from 75 to 99% by weight of unsaturated ester. Mixtures of cellulose esters with copolymers which contain less than 75% by weight of unsaturated ester are not compatible and no useful films are obtained.

It has now surprisingly been found that moulding compounds which can be thermoplastically processed as required yielding transparent products of improved dimensional stability at elevated temperature are obtained without the disadvantages mentioned above if cellulose esters are mixed with incompatible copolymers of ethylene and vinyl esters.

Mixtures of cellulose esters and ethylene/vinyl ester copolymers are in general incompatible if the content of vinyl ester in the copolymer is 75% by weight or less. The vinyl ester content of incompatible copolymers may vary from about 30 to about 75% by weight based on the copolymer. Incompatibility can be determined according to known methods, for example by determination of the modulus in shear of the mixtures.

The mixtures according to the present invention may additionally contain compatible copolymers, i.e., ethylene/vinyl ester copolymers having a vinyl ester content of more than 75% by weight.

This invention therefore relates to thermoplastically processible moulding compounds consisting essentially of (1) 1 to 99 percent by weight, preferably 50 to 99 percent by weight, of at least one cellulose ester of an aliphatic carboxylic acid,
(2) 99 to 1 percent by weight, preferably 1 to 50 percent by weight of an ethylene/vinyl ester copolymer containing 30 to 75 percent by weight, preferably 60 to 75 percent by weight of vinyl esters and
(3) 0 to 50 by weight, preferably 0 to 25 percent by weight of an ethylene/vinyl ester copolymer containing 75.1 to 98% by weight of vinyl ester. The sum of components (1) to (3) is 100 percent by weight.

Thermoplastic moulding compounds which are particularly preferred consist essentially of (1) 99 to 70 percent by weight of at least one cellulose ester of an aliphatic acid,
(2) 1 to 30 percent by weight of an ethylene/vinyl acetate copolymer containing 60 to 75 percent by weight of vinyl acetate and
(3) 0 to 25 percent by weight of an ethylene/vinyl acetate copolymer containing 75.1 to 98% by weight of vinyl acetate. The sum of components (1) and (3) is 100 percent by weight.

One particularly surprising feature of the moulding compounds according to the invention is their transparency and their very good mechanical properties.

Suitable cellulose esters for the preparation of the moulding compounds according to the invention are cellulose esters of aliphatic carboxylic acids containing 1 to 5 carbon atoms, particularly cellulose acetate, cellulose acetopropionate and cellulose acetobutyrate.

Processes for the preparation of organic cellulose esters have been known for a long time and have been described, for example, in Ullmanns Encyklopädie der technischen Chemie (Publishers Urban & Schwarzenberg, Munich-Berlin, 1963) in Volume 5 on pages 182 to 201.

Preferred cellulose acetobutyrates contain
40 to 50% of butyric acid,
15 to 26% of acetic acid and
0.75 to 1.95% of hydroxyl.

Cellulose acetobutyrates of the following composition are particularly suitable for the moulding compounds according to the invention.

42 to 46% of butyric acid,
18 to 21% of acetic acid and
1.0 to 1.7% of hydroxyl.

Preferred cellulose acetopropionates generally contain 50 to 63.5% of propionic acid,
1 to 12% of acetic acid and
1.2 to 1.95% of hydroxyl are particularly preferred cellulose acetopropionates have the following composition:

54 to 58% of propionic acid,
5 to 8% of acetic acid and
1.5 to 1.8% of hydroxyl.

The cellulose acetates used are preferably secondary cellulose acetates.

The percentages given here and in the following are percentages by weight and parts are parts by weight.

The relative viscosities ($\eta_{rel}$) of 2% solutions in acetone at 25° C of the aliphatic cellulose esters used are between 2.5 and 6.0 and preferably between 3.5 and 4.5.

The vinyl esters used may be organic vinyl esters of saturated, optionally halogenated, in particular chlorinated, aliphatic monocarboxylic acids containing 1 to 18 carbon atoms or aromatic monocarboxylic acids containing 7 to 11 carbon atoms. The following are specific examples: Vinyl formate, vinyl acetate, vinyl propionate, vinyl chloropropionate, vinyl butyrate, vinylisobutyrate, vinyl caproate, vinyl laurate, vinyl myristate, vinyl stearate and vinyl benzoate. Vinyl acetate is preferred.

The ethylene/vinyl ester copolymers are prepared by the known methods of high or medium pressure synthesis, optionally in solvents such as tertiary butanol.

Ethylene/vinyl ester copolymers prepared by high pressure synthesis have melt index values (according to DIN 53 735 at 190° C and under a load of 2.16 kp) of between 0.1 and 100, preferably between 1.0 and 10 and more particularly between 4.5 and 6. Their intrinsic viscosities measured in tetralin at 120° C are generally between 0.6 and 1.5. The molecular weights determined by the light diffusion method are preferably between 50,000 and 1,000,000. The non-uniformity U defined by the term $M_w/M_n - 1$ (G.Schulz, Z. phys. Chem. (B) 43 (1939) pages 25–34) is in the region of 5 to 30. These copolymers dissolved most easily in hot hydrocarbons.

Ethylene/vinyl ester copolymers prepared, for example, by the process of solution or emulsion polymerisation, which contain e.g. 30 to 98% by weight and preferably 60 to 75% by weight of vinyl ester, may have melt index values (190° C 2.16 kp) greater than 100 and the melt index is preferably below 15 and in particular between 0.5 and 5. The molecular weights determined by the method of light diffusion are preferably between 40,000 and 1,000,000. The non-uniformity U is 1 to 6. The copolymers are soluble in hydrocarbons and alcohols and preferably have intrinsic viscosities of between 0.5 and 2.5, measured in toluene at 25° C.

The ethylene/vinyl acetate copolymers may be partly or completely 20 to 100% saponified if desired.

Composition and melt indices of the ethylene/vinyl acetate copolymers used:

| Name | Vinyl acetate content [%] | MFI |
| --- | --- | --- |
| EVA - 800 | 78 | 0.45 |
| EVA - 700 | 70 | 30 |
| EVA - 600 | 60 | 10.4 |
| EVA - 450 | 44 | 0.54 |
| EVA - 338 | 33 | 64 |
| EVA - 80 | 8 | 5 |

In the above table:
EVA: Ethylene/vinyl acetate copolymer
MFI: Melt index [g/10 min] according to DIN 53 735 under a load of 2.16 kp and at a temperature of 190° C.

Suitable low molecular weight plasticizers include dimethylphthalate; diethylphthalate; triphenylphosphate; methyl phthalyl ethyl glycollate; di-n-butylsebacate; ethylphthalyl ethyl glycollate; butyl phthalyl butyl glycollate; dibutylphthalate; dioctyladipate; dioctylphthalate; butylbenzyl phthalate, triacetin, di-n-butyl adipate, di-n-butyl- and dioctyl azelaic acid ester and dicotyl sebacic acid ester.

Preparation of the moulding compounds according to the invention from organic cellulose esters and ethylene/vinyl ester copolymers which may, if desired, be modified with low molecular weigh plasticizers is carried out by vigorously mixing the components. Any known mixing method may be used on rollers or in screw extruders.

The thermoplastically processible mixtures may also be prepared in form of powders via their solutions. In that case, the components are dissolved in suitable solvents or solvent mixtures, and the polymer mixtures may be precipitated with suitable non-solvents or the solvents or solvent mixtures may be removed by evaporation. Methylene chloride and glacial acetic acid, for example, are suitable solvents for organic cellulose esters and ethylene/vinyl ester copolymers. The mutual precipitating agent used may be hexane, for example, if the components have been dissolved in methylene chloride.

The mixtures according to the invention may also contain certain other additives to colour or pigment the polymer mixtures or improve their resistance to oxidation, light or combustion and the like.

The moulding compounds according to the invention prepared from ethylene/vinyl ester copolymers and organic cellulose esters show a remarkable increase in the notched impact strength measured according to DIN 53 453.

In addition, the moulding compounds according to the invention are distinguished by their improved dimensional stability at elevated temperature determined e.g. as the Vicat softening temperature according to DIN 53 460.

The improved properties of the moulding compounds are clearly evident from a comparison with cellulose ester which have been modified with low molecular weight plasticizers. Moulded products according to the present invention which have the same notched impact strength as conventionally modified cellulose esters have a considerably higher dimensional stability at elevated temperature (compare for example Table 1, Examples 5 to 9 and Table 2, Examples 27 to 30 with Table 3).

Compared with conventional cellulose ester moulding compounds which contain low molecular weight plasticizers, the polymer mixtures according to the invention also show improved mechanical properties such as an increase in their hardness, tensile strength, flexural strength and modulus of elasticity.

The polymer mixtures of organic cellulose esters and ethylene/vinyl ester copolymers are virtually free from the well known effect of so-called plasticizer migration and the moulding compounds are therefore also particularly suitable, for example, for purposes in which they come into contact with foodstuffs.

In the examples marked L, the polymer mixtures are prepared as solutions and then precipitated. The appropriate parts by volume of 10% methylene chloride solutions of cellulose acetobutyrate and of ethylene/vinyl acetate copolymer are mixed and the polymer mixture is precipitated with hexane. The resulting mixtures are dried and then extruded to form test samples as mentioned above.

TABLE 1

| Example | EVA | VAC % | % EVA | $a_n$ | $a_k$ | Vicat | δbF | $H_k30$ | Transparency |
|---------|-----|-------|-------|-------|-------|-------|-----|---------|--------------|
| 1 | 800 | 78 | 5 | unbroken | 2 | 107 | 79 | 84 | + |
| 2 | 800 | 78 | 10 | unbroken | 2 | 95 | 66 | 86 | + |
| 2L | 800 | 78 | 10 | unbroken | 3 |  | 71 | 87 | + |
| 3 | 800 | 78 | 15 | unbroken | 1 | 86 | 62 | 86 | + |
| 4 | 800 | 78 | 20 | unbroken | 2 | 76 | 57 | 85 | + |
| 5 | 700 | 70 | 5 | unbroken | 4,8 | 107 | 77 | 81 | + |
| 6 | 700 | 70 | 10 | unbroken | 10,6 | 97 | 70 | 71 | + |
| 7 | 700 | 70 | 15 | unbroken | 17,7 | 92 | 65 | 61 | + |
| 8 | 700 | 70 | 20 | unbroken | 23,4 | 81 | 56 | 53 | + |
| 9 | 700 | 70 | 25 | unbroken | 22,5 | 72 |  | 44 | + |
| 10 | 600 | 60 | 10 | unbroken | 15 | 98 | 65 | 63 | + |
| 11 | 600 | 60 | 20 | unbroken | 25 | 65 | 46 | 42 | + |
| 12 | 450 | 44 | 5 | unbroken | 20 | 100 | 66 | 67 | + |
| 13 | 450 | 44 | 10 | unbroken | 12 | 90 | 60 | 59 | + |
| 13L | 450 | 44 | 10 | unbroken | 12 | 103 | 68 | 65 | + |
| 14 | 450 | 44 | 15 | unbroken | 10 | 78 | 53 | 51 | + |
| 15 | 450 | 44 | 20 | unbroken | 33 | 74 | 47 | 41 | + |
| 16 | 80 | 8 | 5 | 19 | 21 | 106 | 64 | 65 | − |
| 17 | 80 | 8 | 10 | 34 | 32 | 94 | 59 | 56 | − |
| 18 | 80 | 8 | 20 | 27 | 28 | 56 | 38 | 34 | − |

Legend to Table:
$a_n$: Impact strength according to DIN 53 453; Dimension: [kJ/m²].
$a_k$: Notched impact strength according to DIN 53 453; Dimension: [kJ/m²].
Vicat: Vicat softening temperature according to Method B (Force 49.05 N) according to DIN 53 460; Dimension: [° C].
δbF: Bending yield stress according to DIN 53 452; Dimension: [N/mm²].
$H_k30$: Ball pressure hardness after 30 s according to DIN 53 456; Dimension: [N/mm²].
Transparency: + denotes glass clear transparency − denotes opaque.

Because of the improved resistance of the mixtures to weathering they can also be used for outdoor garments.

The moulding compounds according to the invention can be used for the production of shaped articles of any kind and for the production of acetate silk, block acetate, foil substrates for safety films, packaging material and electric insulating foils.

Mixtures of organic cellulose esters and ethylene/vinyl ester copolymers can be processed continuously or batchwise in known extruders and injection moulding machines without any substantial difficulty and have good fluidity properties under these conditions.

EXAMPLES 19 and 32

Cellulose acetopropionate containing 54 to 58% of propionic acid, 5 to 8% of acetic acid and 1.5 to 1.8% of free hydroxyl groups is vigorously mixed with ethylene/vinyl acetate copolymer on a roller at 180° C as indicated in the following Table.

The roller sheets are granulated and then extruded in an injection moulding machine at a mass temperature of 240° C to form test samples.

In the Examples marked L, the polymer mixtures are prepared as solutions which are subsequently precipitated, as described in Examples 1 to 18.

TABLE 2

| Example | EVA | VAC % | % EVA | $a_n$ | $a_k$ | Vicat | δbF | $H_k30$ | Transparency |
|---------|-----|-------|-------|-------|-------|-------|-----|---------|--------------|
| 19 | 800 | 78 | 5 | unbroken | 2,6 | 116 | 87 | 91 | + |
| 20 | 800 | 78 | 10 | unbroken | 2,6 | 106 | 82 | 84 | + |
| 20L | 800 | 78 | 10 | 12 | 2,6 | 100 | 80 | 95 | + |
| 21 | 800 | 78 | 15 | unbroken | 4,2 | 102 | 81 | 80 | + |
| 22 | 800 | 78 | 20 | unbroken | 7,4 | 97 | 74 | 71 | + |
| 23 | 700 | 70 | 5 | unbroken | 4,2 | 120 | 79 | 86 | + |
| 24 | 700 | 70 | 10 | unbroken | 9,0 | 111 | 72 | 75 | + |
| 25 | 700 | 70 | 15 | unbroken | 16,9 | 103 | 67 | 65 | + |
| 26 | 700 | 70 | 20 | unbroken | 23,5 | 91 | 61 | 58 | + |
| 27 | 450 | 44 | 5 | 60 | 5 | 112 | 74 | 75 | + |
| 28 | 450 | 44 | 10 | 40 | 7 | 100 | 64 | 65 | + |
| 29 | 450 | 44 | 15 | 34 | 18 | 84 | 56 | 57 | + |
| 30 | 450 | 44 | 20 | 45 | 33 | 72 | 47 | 44 | + |
| 31 | 338 | 33 | 10 | 14 | 5 | 95 | 60 | 70 | + |
| 32 | 338 | 33 | 20 | 14 | 8 | 40 | 40 | 38 | + |

EXAMPLES 1 to 18

Cellulose acetobutyrate containing 42 to 46% of butyric acid, 18 to 21% of acetic acid and 1.0 to 1.7% of hydroxyl groups is vigorously mixed with ethylene/vinyl acetate copolymers on rollers at 170° C as indicated in the following Table.

The rolled sheets are granulated and then extruded in an injection moudling apparatus at a mass temperature of 230° C to form test samples.

When similar cellulose acetopropionates are mixed with the low molecular weight plasticizer dibutyladipate, the test samples obtained have much lower VIcat softening points.

TABLE 3

| % Dibutyladipate | Vicat[° C] | $a_k$[kJ/m²] |
|------------------|------------|--------------|
| 5 | 100 | 3 |
| 10 | 82 | 12 |

TABLE 3-continued

| % Dibutyladipate | Vicat[° C] | $a_k$[kJ/m²] |
|---|---|---|
| 15 | 68 | 20 |
| 20 | 54 | 28 |

EXAMPLES 33 to 35

Secondary cellulose acetate is vigorously mixed with ethylene/vinyl acetate copolymer on a roller at 220° C as indicated in the following Table.

The rolled sheets are granulated and then extruded in an injection moulding apparatus at a mass temperature of 230° C produce test samples.

In the examples marked L, the polymer mixtures are prepared as solution which are then precipitated, as described in Examples 1 to 18.

| Example | EVA | % EVA | V Ac % | $a_n$ | $a_k$ | Vicat | $\delta_b F$ | $H_k 30$ | Transparency |
|---|---|---|---|---|---|---|---|---|---|
| 33 | 800 | 10 | 78 | 15 | 2 | 151 | $83_{bB}$ | 102 | + |
| 33L | 800 | 10 | 78 | 10 | 2.5 | 155 | $93_{bB}$ | 108 | + |
| 34 | 800 | 20 | 78 | 17 | 2 | 122 | 72 | 70 | + |
| 34L | 800 | 25 | 78 | 27 | 4.8 | 73 | 44 | 35 | + |
| 35 | 700 | 20 | 70 | 50 | 2 | 126 | $57_{bB}$ | 55 | + |

We claim:

1. An injection molded or extruded article of
   (1) 1 to 99 percent by weight of at least one cellulose ester of a $C_1$–$C_5$-aliphatic carboxylic acid, the relative viscosity thereof being between 2.5 and 6.0,
   (2) 99 to 1 percent by weight of an incompatible ethylene/vinyl ester copolymer containing 30 to 75 percent by weight of vinyl esters of $C_1$–$C_{18}$-aliphatic or $C_7$–$C_{11}$-aromatic carboxylic acids and
   (3) 0–50 percent by weight of a compatible ethylene/vinyl ester copolymer containing 75.1 to 98 percent by weight of vinylesters of $C_1$–$C_{18}$-aliphatic or $C_7$–$C_{11}$-aromatic carboxylic acids, the sum of components (1) to (3) being 100 percent by weight.

2. An article as claimed in claim 1, which consists essentially of 50 to 99 percent by weight of component (1), 1 to 50 percent by weight of component (2) and 0 to 25 percent by weight of component (3), the sum of components (1) to (3) being 100 percent by weight.

3. An article as claimed in claim 2, which consists essentially of 99 to 70 percent by weight of component (1) 1 to 30 percent by weight of component (2) and 0 to 25 percent by weight of component (3), the sum of components (1) to (3) being 100 percent by weight.

4. An article as claimed in claim 1, in which component (2) contains 60 to 75 percent by weight of vinyl ester.

5. An article as claimed in claim 1, in which component (1) comprises cellulose acetate, cellulose acetopropionate or cellulose acetobutyrate.

6. An article as claimed in claim 5, in which component (1) comprises cellulose acetobutyrate containing 40 to 50% by weight of butyric acid, 15 to 26% by weight of acetic acid and 0.75 to 1.95% by weight of hydroxyl.

7. An article as claimed in claim 6, in which the cellulose acetobutyrate contains 42 to 46% by weight of butyric acid, 18 to 21% by weight of acetic acid and 1.0 to 1.7 by weight of hydroxyl.

8. An article as claimed in claim 5, in which component (1) comprises cellulose acetopropionate containing 50 to 63.5% by weight of propionic acid, 1 to 12% by weight of acetic acid and 1.2 to 1.95% by weight of hydroxyl.

9. An article as claimed in claim 8, in which the cellulose acetopropionate contains 54 to 58% by weight of propionic acid, 5 to 8% by weight of acetic acid 1.5 to 1.8% by weight of hydroxyl.

10. An article as claimed in claim 5, in which component (1) comprises a secondary cellulose acetate.

11. An article as claimed in claim 1, in which the vinyl ester is the vinyl ester of a saturated aliphatic halogenated monocarboxylic acid.

12. An article as claimed in claim 1, in which the vinyl ester component is vinyl formate, acetate, propionate, chloropropionate, butyrate, isobutyrate, caproate, laurate, myristate, stearate or benzoate.

* * * * *